(12) United States Patent
Yasuno

(10) Patent No.: US 12,445,951 B2
(45) Date of Patent: Oct. 14, 2025

(54) INFORMATION PROCESSING APPARATUS CAPABLE OF PREVENTING AUTOMATIC DIRECT CONNECTION FROM REMOTE MOBILE DEVICES

(71) Applicant: Canon Kabushiki Kaisha, Tokyo (JP)

(72) Inventor: Takashi Yasuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 17/989,843

(22) Filed: Nov. 18, 2022

(65) Prior Publication Data

US 2023/0180119 A1 Jun. 8, 2023

(30) Foreign Application Priority Data

Dec. 7, 2021 (JP) ................. 2021-198637

(51) Int. Cl.
  *H04W 48/18* (2009.01)
  *H04W 76/10* (2018.01)
(52) U.S. Cl.
  CPC .......... *H04W 48/18* (2013.01); *H04W 76/10* (2018.02)
(58) Field of Classification Search
  CPC ..... H04W 48/18; H04W 76/10; H04W 76/14; H04W 84/12; H04W 88/06; Y02D 30/70
  See application file for complete search history.

(56) References Cited

U.S. PATENT DOCUMENTS

| | | |
|---|---|---|
| 10,165,548 B2 | 12/2018 | Yokoyama et al. |
| 10,656,891 B2 | 5/2020 | Nagahara |
| 11,836,405 B2 * | 12/2023 | Shinozuka ............ G06F 3/1286 |
| 2010/0217881 A1 * | 8/2010 | Iino ...................... H04W 12/062 709/229 |
| 2013/0016710 A1 * | 1/2013 | Shinohara ............. H04W 88/02 370/338 |
| 2013/0182695 A1 * | 7/2013 | Hahm ................... H04W 84/12 370/338 |

(Continued)

FOREIGN PATENT DOCUMENTS

| | | |
|---|---|---|
| JP | 2017-098901 A | 6/2017 |
| JP | 2019-075722 A | 5/2019 |

(Continued)

*Primary Examiner* — Ayman A Abaza
*Assistant Examiner* — Alyssa Williams
(74) *Attorney, Agent, or Firm* — Venable LLP

(57) ABSTRACT

An information processing apparatus capable of preventing remote mobile devices from performing automatic direct connection. The information processing apparatus is capable of establishing wireless direct connection to a mobile terminal by using wireless communication via a first communication section conforming to a first wireless communication standard and wireless communication via a second communication section conforming to a second wireless communication standard which is higher in data transfer rate for a smaller area than the first wireless communication standard. Selection menus for configuring settings for establishing the direct connection to the mobile terminal are sequentially displayed on a display section, and a user performs selection operations according to the selection menus, whereby the wireless direct connection to the mobile terminal via the second communication section is established.

5 Claims, 10 Drawing Sheets

(56) References Cited

U.S. PATENT DOCUMENTS

| | | | | |
|---|---|---|---|---|
| 2013/0185637 | A1* | 7/2013 | Morotomi | H04M 1/72403 |
| | | | | 709/231 |
| 2014/0044010 | A1* | 2/2014 | Hiroshige | H04L 67/75 |
| | | | | 370/254 |
| 2016/0330774 | A1* | 11/2016 | Takae | H04W 8/183 |
| 2019/0082062 | A1* | 3/2019 | Okada | H04N 1/00352 |
| 2019/0297646 | A1* | 9/2019 | Lou | H04B 7/0695 |
| 2020/0314752 | A1* | 10/2020 | Haque | H04W 76/28 |
| 2020/0395998 | A1* | 12/2020 | Yamamoto | H04W 76/34 |
| 2021/0240312 | A1* | 8/2021 | Wohlstadter | G06F 3/0482 |
| 2021/0306945 | A1 | 9/2021 | Morimoto | |

FOREIGN PATENT DOCUMENTS

| | | |
|---|---|---|
| JP | 2020-010362 A | 1/2020 |
| JP | 2021-158545 A | 10/2021 |

* cited by examiner

FIG. 4B

409 — ADMINISTRATOR MODE
- Select item to be set.
- Energy-saving direct connection display : OFF
- Return 410 — ADMINISTRATOR MODE
<Energy-saving direct connection display>
- ON
- OFF
- × CANCEL
- OK
- Return 411 — ADMINISTRATOR MODE
- Select item to be set.
- Energy-saving direct connection display : ON
- Return 412 — DIRECT CONNECTION SETTING
- Select item to be set.
- Use high-speed direct connection : OFF
- Use energy-saving direct connection : OFF
- IP address setting in direct connection
- Return 413 — DIRECT CONNECTION SETTING
<Use energy-saving direct connection>
- ON
- OFF
- × CANCEL
- OK
- Return 414 — ENERGY-SAVING DIRECT CONNECTION
SSID02 enables low-power consumption wireless communication.
If you would like to use high-speed communication, connection using SSID01 is recommended.
* If arbitrary SSID and network key are set, there is a possibility that another device may erroneously connect from remote location, and hence such SSID and network key cannot be used.

SSID02 : mfp_11ah
Network key02 : key_11ah

Return

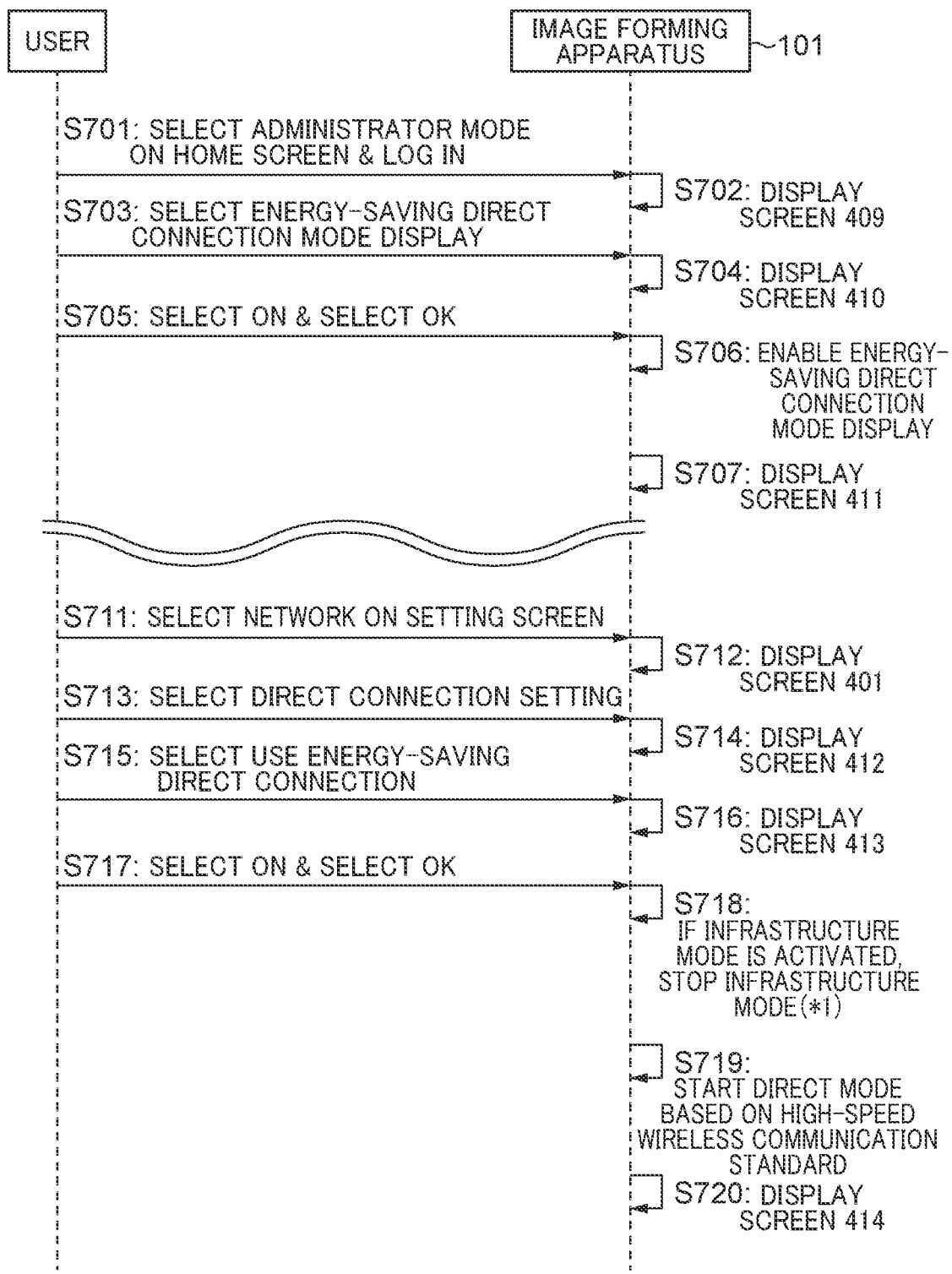

INFORMATION PROCESSING APPARATUS CAPABLE OF PREVENTING AUTOMATIC DIRECT CONNECTION FROM REMOTE MOBILE DEVICES

BACKGROUND OF THE INVENTION

Field of the Invention

The present invention relates to an information processing apparatus capable of preventing automatic direct connection from remote mobile devices.

Description of the Related Art

In recent years, a system referred to as the Internet of Things (IoT) in which a variety of more than 50 billion devices are connected to the Internet has started to come into widespread use. In the IoT, as the wireless LAN standard for connecting a device to the Internet, a variety of standards have been proposed.

For example, the variety of wireless LAN standards include IEEE802.11ah (hereinafter also referred to as 11ah) which has been standardized by the IEEE in 2016. The first characteristic of the standard 11ah is the use of a frequency band of 900 (MHz) referred to as the sub GHz band. With this, compared with a conventional Wi-Fi® standard (e.g. IEEE802.11ax; "Wi-Fi" is a registered trademark of Wi-Fi Alliance referring to IEEE 802.11x standards), wide-area communication in which a reachable range of radio waves is more than a 1 km radius is realized by the standard 11ah.

Further, the second characteristic is that the standard 11ah requires lower power than the conventional Wi-Fi® standard. This is realized by an energy-saving specification added by a communication protocol simplified from that of the conventional Wi-Fi® standard. The third characteristic is, on the other hand, that the sub GHz band has a small available bandwidth, and hence the throughput of the standard11ah is reduced to approximately 1 Mbps, compared with the conventional Wi-Fi® standard.

Incidentally, there is a wireless communication mode referred to as a direct wireless communication mode in which a mobile terminal and an image forming apparatus can be wirelessly and directly connected to each other even under a network environment where there is no wireless LAN router (see e.g. Japanese Laid-Open Patent Publication (Kokai) No. 2019-75722). In the direct wireless communication mode, when a user performs an operation for selecting a direct connection function by operating a console section included in the image forming apparatus, connection information (SSID and network key) is displayed on a display screen of the image forming apparatus. On the other hand, the user selects the SSID displayed on the display screen of the image forming apparatus from an SSID list displayed on a display screen of the mobile terminal and inputs the network key, whereby the direct connection is established. Further, the image forming apparatus can also provide the mobile terminal with the connection information for realizing the direct wireless communication, by using Near Field Communication (NFC), Bluetooth® Low Energy (BLE; registered trademark of Bluetooth Special Interest Group), a quick-response code, e.g. QR Code® (registered trademark of Denso Wave), or the like.

In a state of the image forming apparatus side in which connection information for establishing the direct connection has been set to desired values, when the mobile terminal performs a connection setting operation for the first time and thereby establishes the direct connection, the aforementioned connection information is held in the mobile terminal. Therefore, from next time on, the mobile terminal can be automatically connected to the image forming apparatus without inputting the connection information, which improves the convenience.

However, in a case where the image forming apparatus as an example of an information processing apparatus supports the standard 11ah, the image forming apparatus is capable of communicating with mobile terminals existing in a wider area than in the case of the conventional Wi-Fi® standard. This increases the possibility that mobile terminals having once established the direct connection are automatically reconnected. As a result, the number of mobile terminals, such as mobile devices, in a state directly connected to the image forming apparatus tends to reach the upper limit value of mobile terminals that can establish the direct connection to the image forming apparatus, so that there arises a case where a user who actually desires to use the direct connection cannot use the direct connection. That is, according to the standard 11ah, since radio waves reach mobile terminals existing in a wide area, the direct connection is sometimes unintentionally performed.

SUMMARY OF THE INVENTION

The present invention provides an information processing apparatus that is capable of preventing remote mobile devices from performing automatic direct connection thereto.

In a first aspect of the present invention, there is provided an information processing apparatus that is capable of using wireless infrastructure connection or wireless direct connection for communication with a mobile terminal, including a first communication section configured to perform wireless communication conforming to a first wireless communication standard, a second communication section configured to perform wireless communication conforming to a second wireless communication standard which is higher in data transfer rate for a smaller area than the first wireless communication standard, at least one processor, and a memory coupled to the at least one processor, the memory having instructions that, when executed by the processor, perform the operations as: a communication controller configured to control communication with the mobile terminal, in a first communication control mode in which the wireless infrastructure connection via the second communication section is allowed, and the wireless direct connection via the first communication is allowed, and in a second communication control mode in which the wireless infrastructure connection via the first communication section is allowed, and the wireless direct connection via the first communication is allowed.

In a second aspect of the present invention, there is provided an information processing apparatus that is capable of using wireless infrastructure connection or wireless direct connection for communication with a mobile terminal, including a first communication section configured to perform wireless communication conforming to a first wireless communication standard, a second communication section configured to perform wireless communication conforming to a second wireless communication standard which is higher in data transfer rate for a smaller area than the first wireless communication standard, at least one processor, and a memory coupled to the at least one processor, the memory having instructions that, when executed by the processor, perform the operations as: a display controller configured to cause a message prompting use of not the first wireless communication standard but the second wireless communication standard for the wireless direct connection, to be displayed on the display section.

According to the present invention, it is possible to prevent remote mobile devices from performing automatic direct connection.

Further features of the present invention will become apparent from the following description of exemplary embodiments (with reference to the attached drawings).

BRIEF DESCRIPTION OF THE DRAWINGS

FIG. 7 is a diagram useful in explaining a sequence of displaying energy-saving direct connection information in the second embodiment.

DESCRIPTION OF THE EMBODIMENTS

The present invention will now be described in detail below with reference to the accompanying drawings showing embodiments thereof.

The embodiments of the present invention will now be described in detail below with reference to the accompanying drawings. However, the components described in the following embodiments are described only by way of example, and are by no means intended to limit the scope of the present invention to them alone. First, a first embodiment of the present invention will be described.

Figure 1:
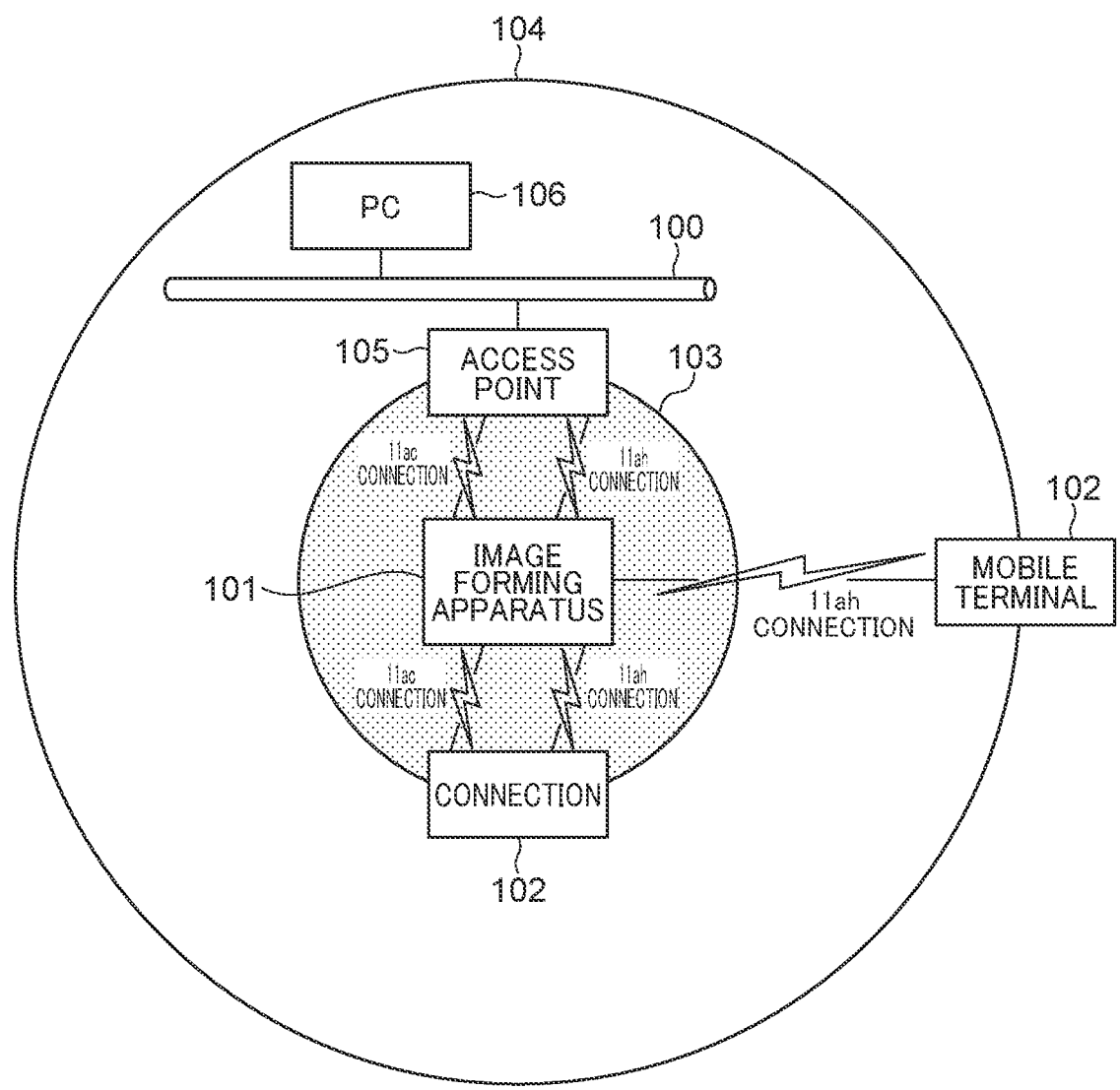
FIG. 1 is a schematic explanatory diagram of an information processing system according to embodiments of the present invention.

FIG. 1 is a schematic explanatory diagram showing the configuration of an information processing system according to the embodiments of the present invention. As shown in FIG. 1, the information processing system includes an image forming apparatus 101, mobile terminals 102, and a Personal Computer (PC) 106.

The image forming apparatus 101 (information processing apparatus) supports a standard (such as 11ah) of wireless communication, as a first wireless communication standard, which is low in data transfer rate, capable of wide-area communication, and low in power consumption. Further, the image forming apparatus 101 also supports a standard (such as 11ac) of wireless communication, as a second wireless communication standard, which is high in data transfer rate and capable of small-area communication. In FIG. 1, reference numerals 104 and 103 indicate an area where wireless communication conforming to the first wireless communication standard is possible and an area where wireless communication conforming to the second wireless communication standard is possible, respectively.

Therefore, in a case where the mobile terminal 102 exists in the area indicated by the reference numeral 103, the image forming apparatus 101 and the mobile terminal 102 can wirelessly communicate with each other by both types of wireless communication conforming to the first and second wireless communication standards, respectively. On the other hand, in a case where the mobile terminal 102 exists in the wider area indicated by the reference numeral 104, the image forming apparatus 101 and the mobile terminal 102 can wirelessly communicate with each other only by the type of wireless communication conforming to the first wireless communication standard.

The image forming apparatus 101 is equipped with the direct connection (wireless connection) function capable of performing direct connection to the mobile terminal 102 by wireless communication. A user enables a setting of the image forming apparatus 101 for using the direct connection. Then, the user sets a Service Set Identifier (SSID) and a network key, displayed on a display section 210 included in a console section 204 of the image forming apparatus 101, for the mobile terminal 102, whereby the image forming apparatus 101 and the mobile terminal 102 are enabled to use the direct connection.

Further, the image forming apparatus 101 is communicably connected to the PC 106 by the both types of wireless communication conforming to the first and second wireless communication standards via an access point 105 and a network 100. The user enables a setting of the image forming apparatus 101 for using infrastructure connection. Then, the user selects an SSID of the access point 105 from an SSID list displayed on the display section 210 and inputs a network key, whereby the infrastructure connection of the image forming apparatus to the network 100 is enabled. In an infrastructure connection mode (referred to hereinafter as "the infrastructure mode"), the image forming apparatus 101 supports both of the wireless communication conforming to the first wireless communication standard and the wireless communication conforming to the second wireless communication standard.

The infrastructure connection refers e.g. to a form of connection in which the image forming apparatus 101 (information processing apparatus) is communicably connected to the other PC 106 via the network 100. Further, the infrastructure connection in an example illustrated in FIG. 1 supports both the wireless communication conforming to the first wireless communication standard and the wireless communication conforming to the second wireless communication standard.

In general, the power supply state of the image forming apparatus 101 has a sleep mode in which power consumption is small and a standby mode in which power consumption is large. In the standby mode, to process transmission and reception of large-volume image data in a short time, it is desirable to use the wireless communication conforming to the second wireless communication standard which is high in data transfer rate. On the other hand, in the sleep mode, it is desirable to use the wireless communication conforming to the first wireless communication standard which is low in power consumption until a print job execution command is received from the PC 106.

Figure 2:
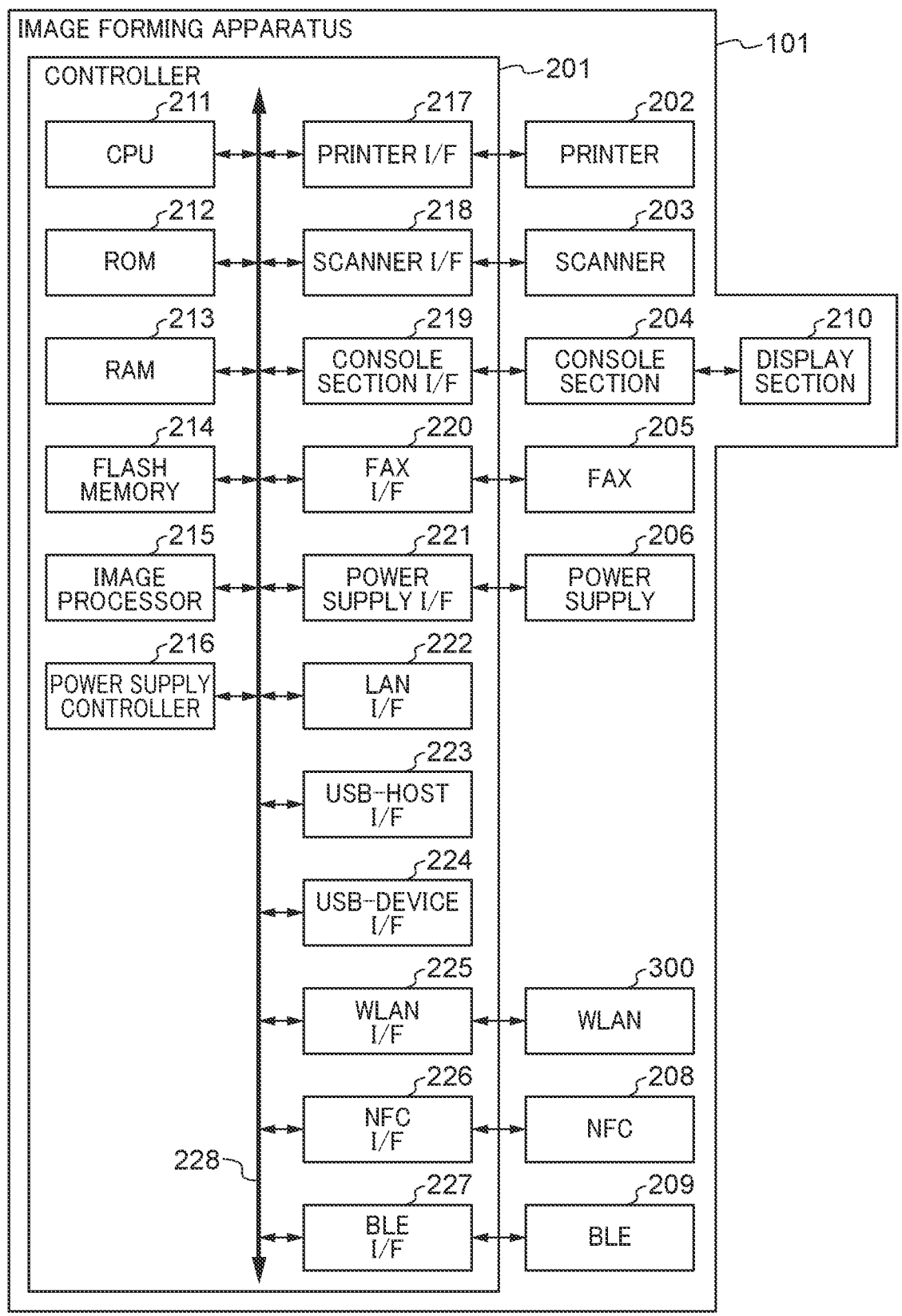
FIG. 2 is a block diagram showing a hardware configuration of an image forming apparatus according to the embodiments of the present invention.

FIG. 2 is a block diagram showing a hardware configuration of the image forming apparatus 101 according to the embodiments of the present invention. The image forming apparatus 101 includes a controller 201, a printer 202, a scanner 203, the console section 204, a FAX 205, and a power supply 206. Further, the controller 201 includes a CPU 211 (a display controller and a communication controller), a ROM 212, a RAM 213, a flash memory 214, an image processor 215, and a power supply controller 216. The CPU 211 has functions, such as a variety of display control functions and a variety of communication control functions.

Further, the controller 201 includes a printer interface 217, a scanner interface 218, a console section interface 219, a FAX interface 220, a power supply interface 221, and a LAN interface 222. Further, the controller 201 includes a USB-host interface 223, a USB-device interface 224, a WLAN interface 225, an NFC interface 226, and a BLE interface 227. These components of the controller 201 are connected to a bus 228.

The CPU 211 controls the overall operation of the system and is configured to be capable of transmitting and receiving signals to and from the components 212 to 227 of the controller 201 via the bus 228. The ROM 212 is a nonvolatile memory for recording a program for starting up the system, necessary data, and so forth. The RAM 213 is a volatile memory that functions as a work area used by the CPU 211 to load a variety of operation programs and execute the loaded programs. The flash memory 214 is a nonvolatile memory for storing a variety of programs used by the CPU 211 to operate the image forming apparatus 101, and data, such as FAX image data, an SSID, and network keys, in a nonvolatile state.

The image processor 215 converts read image data received from the scanner 203 to print image data. Further, the image processor 215 converts image data received from an external device via any of the FAX interface 220, and the interfaces of the LAN interface 222 to the BLE interface 227, to print image data.

The power supply controller 216 controls electric power supplied to each unit according to an operation mode of the image forming apparatus 101. The image forming apparatus 101 has the standby mode and the sleep mode as operation modes. The standby mode refers to a state in which electric power is supplied to all units forming the image forming apparatus 101. The sleep mode refers to a state shifted from the standby mode and low in power consumption, in which power supply to the printer 202, the backlight of the display section 210, and so forth is stopped. The condition for shifting to the sleep mode is any of the elapse of an automatic sleep time period, detection of an operation of pressing a power-saving key, not shown, and the like. The automatic sleep time period can be set by a user as desired based on the product specifications.

Further, the condition for shifting to the standby mode is any of detection of an input operation on the console section 204, detection of an original to be scanned by the scanner 203, detection of reception of a job via an external interface, such as the FAX interface 220, the LAN interface 222, or any one of the USB-host interface 223 to the BLE interface 227, and so forth.

The printer interface 217 is connected to the printer 202 so as to transmit print image data, and transmit and receive a control signal associated with a print operation. The scanner interface 218 is connected to the scanner 203 so as to receive read image data, and transmit and receive a control signal associated with a reading operation. The console section interface 219 is connected to the console section 204 so as to receive input signals indicative of selection from a variety of function keys, execution/stop of a job, turn-on/off of a power key, and so forth, which are input from the console section 204, and transmit display image data. The FAX interface 220 is connected to the FAX 205 so as to transmit and receive image data and a control signal associated with a FAX operation. The power supply interface 221 is connected to the power supply 206 so as to transmit and receive a control signal according to an operation mode of the image forming apparatus 101.

The LAN interface 222 is connected to the network 100 via the access point 105 so as to receive print jobs and image data from a plurality of external apparatuses including the PC 106, which are connected to the network 100. The USB-host interface 223 is connected to an external device, such as a USB memory, so as to transmit and receive image data and the like. The USB-device interface 224 is connected to an external apparatus, such as a PC, so as to receive print jobs and image data from the external apparatus. The WLAN interface 225 is connected to a WLAN 300 so as to transmit and receive image data and control signals.

The NFC interface 226 is connected to a Near-Field Communication (NFC) chip 208 so as to transmit and receive connection information (SSID and network key) data. The BLE interface 227 is connected to a Bluetooth® Low Energy (BLE) chip 209 so as to transmit and receive connection information, and perform control associated with an advertising packet for initially connecting to a mobile terminal.

The printer 202 receives print image data, transmits and receives control signals associated with print operations, and performs print operations including charging of photosensitive drums, exposure of image data, development with toner, transfer of an image to a recording medium, fixing of the image, and so forth. The scanner 203 reads an original, generates and transmits read image data, transmits and receives a control signal associated with a reading operation, and transmits an awake signal upon detection of an original. The console section 204 transmits and receives input signals indicative of selection from a variety of function keys, execution/stop of a job, turn-on/off of a power key, and so forth, and receives and displays display image data Note that the console section 204 is equipped with the display section 210 implemented e.g. by a small-sized liquid crystal display device, and has a touch operation function of receiving a touch operation performed on any of operation icons each displayed on the display section 210, for receiving an instruction by the user. That is, the console section 204 also functions as the display section 210 but is illustrated as if connected to the display section 210 for convenience of explanation.

The FAX 205 performs modulation/demodulation and transmission of image data, transmission and reception of image data to and from a telephone line, and processing for detecting a call signal from the telephone line and connecting to a telephone or a modulation/demodulation section. The power supply 206 performs alternating current-to-direct current conversion of input power and controls the output voltage according to a received control signal. The WLAN 300 will be described in detail hereinafter with reference to FIG. 3. The NFC chip 208 holds and updates connection information of the image forming apparatus 101 and performs communication with the mobile terminal 102 based on the NFC standard. The BLE chip 209 transmits an advertising packet and performs communication with a mobile terminal based on the BLE standard.

Figure 3:
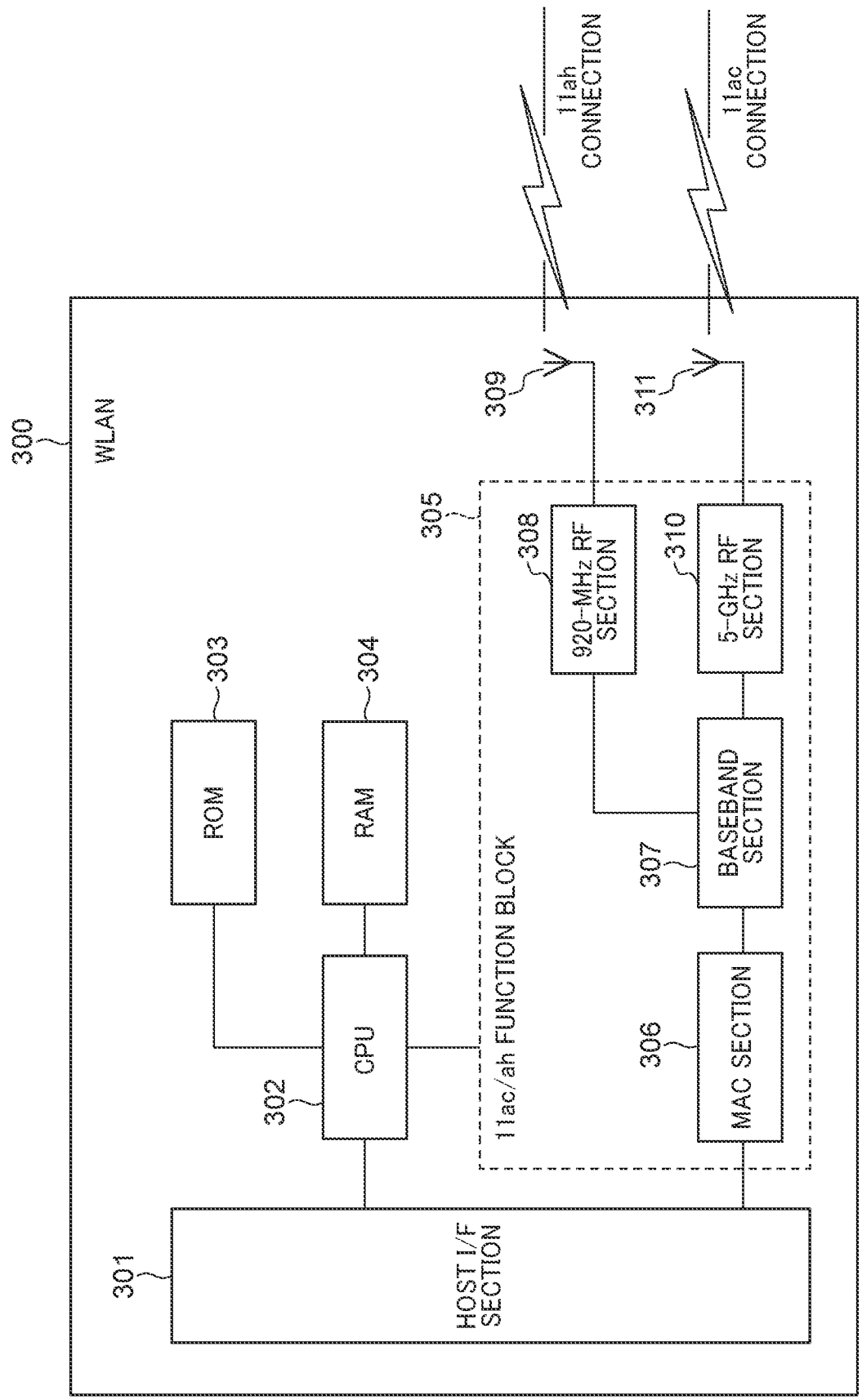
FIG. 3 is a block diagram showing a hardware configuration of a WLAN.

FIG. 3 is a block diagram showing a hardware configuration of the WLAN 300. As shown in FIG. 3, the WLAN 300 is capable of performing the both types of wireless communication conforming to the wireless communication standards 11ac and 11ah. FIG. 3 shows an example of the configuration of the WLAN 300, and for example, the WLAN 300 may be configured to be capable of further performing any of respective types of wireless communication conforming to the wireless communication standards 11a, 11b, 11g, 11n, 11ax, and the like.

The WLAN 300 includes a host interface section 301, a CPU 302 (communication controller), a ROM 303, a RAM 304, an 11ac/ah function block 305, an antenna 309, and an antenna 311. Further, the 11ac/ah function block 305 includes a MAC section 306, a baseband section 307, a 920-MHz RF section 308 (first communication section), and a 5-GHz RF section 310 (second communication section).

The host interface section 301 is an interface with a host system to which the WLAN 300 is connected. The host interface section 301 is generally formed by protocols, such as Universal System Bus (USB), Secure Digital Input/Output (SDIO), and Universal Asynchronous Receiver/Transmitter (UART). In the present embodiment, the host interface section 301 is connected to the CPU 211 via the WLAN interface 225 of the controller 201 included in the image forming apparatus 101.

The CPU 302 is a central processing unit for controlling the overall operation of the WLAN 300. The CPU 302 communicates with the host system via the host interface section 301 and controls the blocks of the WLAN 300 in response to requests from the host system. The ROM 303 is a nonvolatile memory for storing programs and data for the CPU 302 in a nonvolatile state. The RAM 304 is a work memory for the operation of the CPU 302, and stores control programs for the CPU 302. The CPU 302 executes the programs stored in the ROM 303, by using the RAM 304 as the work area, whereby the functions required by the WLAN 300 are realized. Note that for example, a variety of communication control functions of the present invention are realized by the CPU 211 and the CPU 302.

The components of the 11ac/ah function block 305 are controlled by the CPU 302. The MAC section 306 is a Media Access Control (MAC) layer conforming to specifications defined by the wireless communication standard 11ac and the wireless communication standard 11ah. The MAC section 306 performs IP packet processing e.g. for assigning/deleting a MAC address associated with a data link layer. Further, in the MAC layer, as a protocol for avoiding access collision on the network, Carrier Sense Multiple Access With Collision Avoidance (CSMA/CA) is specified. Note that in the standard 11ah, Restricted Access Window (RAW) and Target Wake Time (TWT) functions are added to the MAC layer to save electric power. The CPU 302 can switch the functions of the MAC section 306 to functions of one of the standard 11ac which is the second wireless communication standard and the standard 11ah which is the first wireless communication standard, in response to a request from the host system.

The baseband section 307 is a baseband section conforming to the specifications defined by the wireless communication standard 11ac and the wireless communication standard 11ah. The baseband section 307 has a function of modulating and demodulating a signal between a MAC-processed IP packet and a baseband signal. For the baseband section 307, Orthogonal Frequency Division Multiplexing (OFDM) is specified as the data demodulation method. Further, in the first wireless communication standard 11ah, to save electric power, the clock frequency of the baseband section 307 is designed to be approximately $1/10$ of that of the second wireless communication standard 11ac. The CPU 302 can switch the function of the baseband section 307 to a function of one of the second wireless communication standard 11ac and the first wireless communication standard 11ah, in response to a request from the host system.

The 920-MHz RF section 308 restores, upon receipt of a wireless signal from the antenna 309, the wireless signal to a baseband signal by eliminating a carrier wireless frequency from the wireless signal and delivers the baseband signal to the baseband section 307. When transmitting a wireless signal, the 920-MHz RF section 308 modules a wireless frequency carrier with a baseband signal received from the baseband section 307 to form the wireless signal and delivers the wireless signal from the antenna 309. The 920-MHz RF section 308 supports generation and elimination of a carrier wave in a 920 MHz band used by the first wireless communication standard 11ah. The CPU 302 can turn on or off the function of the 920-MHz RF section 308 in response to a request from the host system.

The 5-GHz RF section 310 restores, upon receipt of a wireless signal from the antenna 311, the wireless signal to a baseband signal by eliminating a carrier wireless frequency from the wireless signal and delivers the baseband signal to the baseband section 307. When transmitting a wireless signal, the 5-GHz RF section 310 modules a wireless frequency carrier with a baseband signal received from the baseband section 307 to form the wireless signal and delivers the wireless signal from the antenna 311. The 5-GHz RF section 310 supports generation and elimination of a carrier wave in a 5 GHz band used by the second wireless communication standard 11ac. The CPU 302 can turn on or off the function of the 5-GHz RF section 310 in response to a request from the host system.

Note that in a case where the present invention is additionally applied to other IEEE802.11 standards, such as the wireless communication standards 11n and 11ax, it is possible to support the other standards by designing and controlling the MAC section 306 and the baseband section 307 such that they conform to these standards. Further, in the case of the wireless communication standard 11n and the wireless communication standard 11ax, it is to be understood that it is only required to connect an RF section supporting 2.4 GHz and an antenna, to the baseband section.

Figure 4:
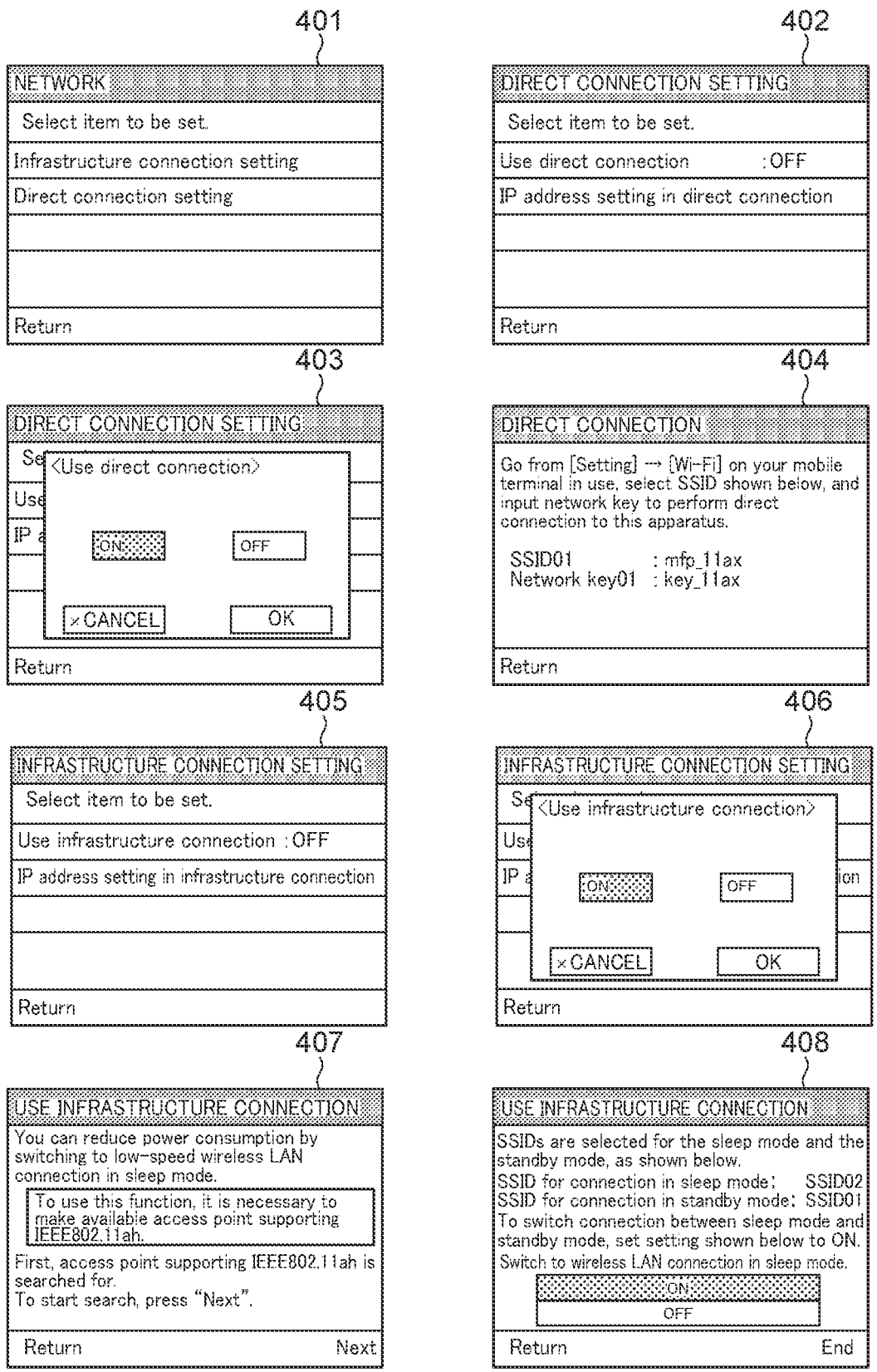
FIG. 4A is a schematic explanatory diagram showing changes of a display screen displayed on a display section in a first embodiment.
FIG. 4B is a schematic explanatory diagram showing changes of the display screen displayed on the display section in a second embodiment.
Figure 5:
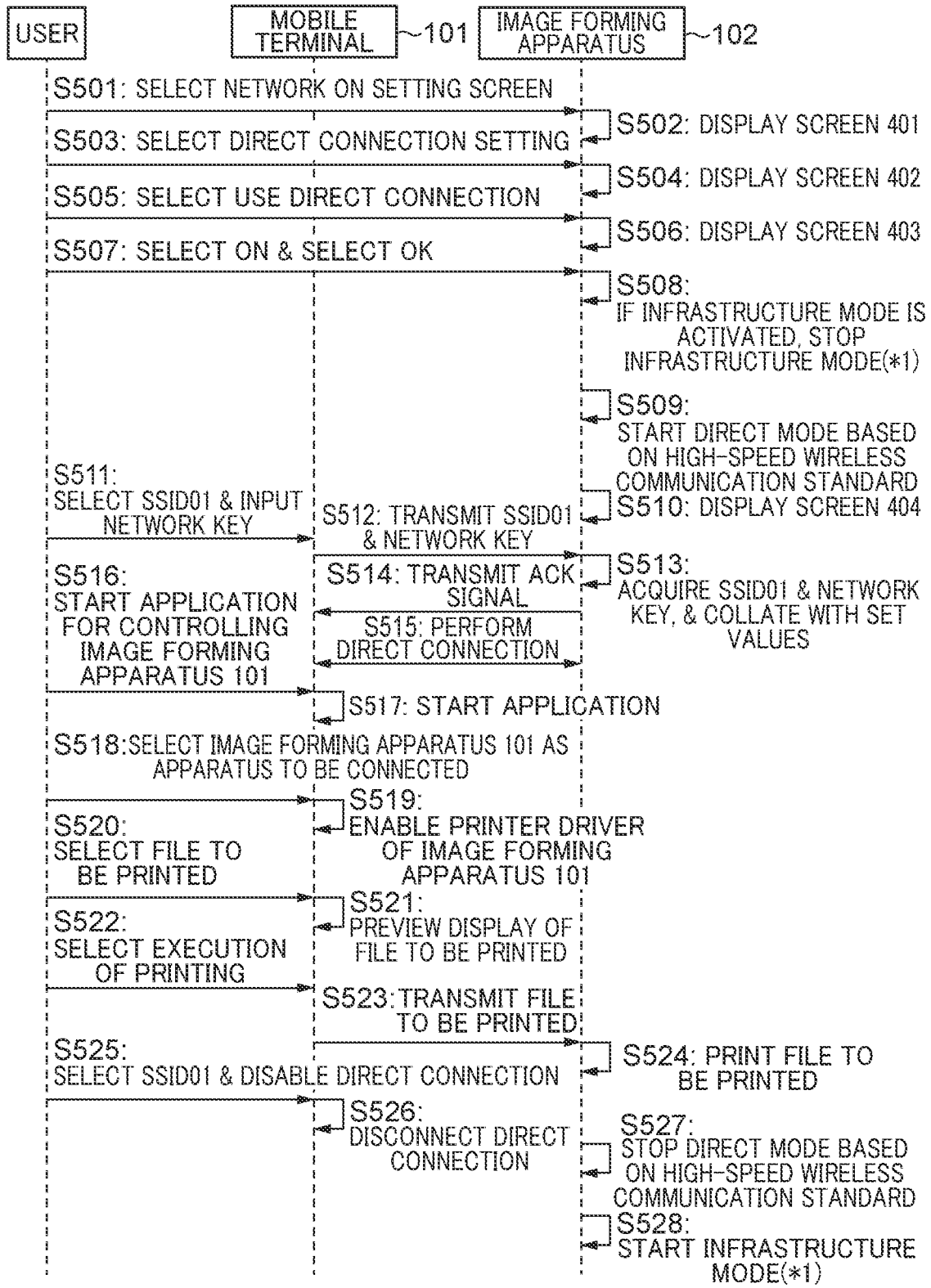
FIG. 5 is a diagram useful in explaining a sequence of direct connection and disconnection by the image forming apparatus according to the first embodiment.

The first embodiment is characterized in that it is possible to make unusable direct connection by the wireless communication conforming to the wireless communication standard 11ah with which wide-area communication is possible. Operations required therefor will be described with reference to FIGS. 4A and 5. FIG. 4A is a schematic explanatory diagram showing changes of a display screen displayed on the display section 210 in the first embodiment, and FIG. 5 is a diagram useful in explaining a sequence of the direct connection and disconnection by the image forming apparatus 101 according to the first embodiment of the present invention.

First, a sequence of the direct connection will be described. In a step S501, a user selects an item "network", not shown, on a setting screen, not shown, displayed on the display section 210. In a step S502, the CPU 211 displays a screen 401 on the display section 210. On the screen 401 displayed on the display section 210, there are selectably displayed an item "infrastructure connection setting" and an item "direct connection setting".

Next, in a step S503, the user selects the item "direct connection setting". In a step S504, the CPU 211 displays a screen 402 on the display section 210 according to the item selected in the step S503. On the screen 402 displayed on the display section 210, there are selectably displayed an item "use direct connection" and an item "IP address setting for direct connection".

Next, in a step S505, the user selects the item "use direct connection". In a step S506, the CPU 211 displays a screen 403 on the display section 210 according to the item selected in the step S505. On the screen 403 displayed on the display section 210, there are displayed an item "ON" an item "OFF", an item "CANCEL", and an item "OK".

Next, in a step S507, the user selects the item "ON" and then selects the item "OK" in succession. In a step S508, if an infrastructure mode is in an activated state, the CPU 211 stops the infrastructure mode. However, the step S508 is executed only in a case where the software of the image forming apparatus 101 does not support simultaneous activation of the infrastructure mode and a direct mode, using the wireless communication conforming to the second wireless communication standard high in data transfer rate. Here, the infrastructure mode is e.g. a connection mode in which the image forming apparatus 101 is capable of communicating predetermined information with the PC 106 via the network 100 and establishing connection for communication with the PC 106.

Next, in a step S509, the CPU 211 starts the direct mode for communicably and directly connecting to the mobile terminal 102 using the second wireless communication standard which is high in data transfer rate and small in a communicable area. In a step S510, the CPU 211 displays a screen 404 on the display section 210. On the display 404 displayed on the display section 210, there is displayed information indicating an operation procedure of the mobile terminal 102 and connection information based on the second wireless communication standard, i.e. SSID01 and network key 01.

Next, in a step S511, on the directly connected mobile terminal 102, the user selects SSID01 selectably displayed on the mobile terminal 102 and then inputs, in succession, a network key to an input box displayed on the mobile terminal 102 so as to enable the user to input the network key.

Next, in a step S512, the mobile terminal 102 transmits the selected SSID01 and the input network key to the image forming apparatus 101. In a step S513, the CPU 211 collates the SSID01 and the network key which are received from the mobile terminal 102, with the information on the SSID and the network key stored in the flash memory 214 in a nonvolatile state.

Next, if it is determined that the received network key and the network key stored in the flash memory 214 in association with the SSID match, in a step S514, the CPU 211 transmits an ACK signal that approves the direct connection, to the mobile terminal 102. Then, in a step S515, the direct connection between the mobile terminal 102 and the image forming apparatus 101 is established.

Further, a message for calling attention to the setting of the direct connection using the wireless communication conforming to the first wireless communication standard may be displayed e.g. on any of the screen 402, the screen 403, and the screen 404, which are displayed on the display section 210. If the direct connection using the wireless communication conforming to the first wireless communication standard is once set, on the mobile terminal 102 which has entered an area where the wireless communication conforming to the first wireless communication standard is possible, the direct connection using the wireless communication is automatically established with the image forming apparatus 101. The attention calling is performed to notify the user of this.

The wireless communication conforming to the first wireless communication standard enables wireless communication with the mobile terminals 102 existing in a wider area, and hence the number of mobile terminals 102 in a state directly connected to the image forming apparatus 101 tends to reach the upper limit value of mobile terminals that can establish the direct connection to the image forming apparatus 101. As a result, there occurs a situation in which a user who actually desires the direct connection cannot use the direct connection, or it is impossible to newly set the direct connection using the wireless communication conforming to the first wireless communication standard for the mobile terminal 102. Therefore, it is necessary to prevent occurrence of such a situation. For this reason, as described above, in a case where the direct connection setting is performed according to selection menus sequentially displayed on the display section 120, the direct connection between the image forming apparatus 101 and the mobile terminal 102 is established such that the wireless communication conforming to the second wireless communication standard which enables small-area communication is used.

Next, a sequence of a print operation by the direct connection will be described. In a step S516, on the mobile terminal 102, the user performs an operation for starting an application for controlling the image forming apparatus 101. In a step S517, the mobile terminal 102 starts the application in response to the operation for starting the application. In a step S518, the user performs an operation for selecting the image forming apparatus 101 as an apparatus to be connected, on the mobile terminal 102. In a step S519, the mobile terminal 102 enables a printer driver of the image forming apparatus 101 which is the apparatus to be connected.

Next, in a step S520, the user selects a file to be printed on the mobile terminal 102. In a step S521, the mobile terminal 102 displays the file to be printed on the display screen of the mobile terminal 102 as a preview. In a step S522, the user selects execution of printing, on the mobile terminal 102. In a step S523, the mobile terminal 102 transmits the file to be printed to the image forming apparatus 101. In a step S524, the printer 202 included in the image forming apparatus 101 prints the file to be printed. Thus, the print operation by the direct connection is executed by the steps S516 to S524.

Next, a sequence of disconnecting the direct connection will be described. In the state in which the direct connection between the mobile terminal 102 and the image forming apparatus 101 has been established, in a step S525, the user selects the SSID by operating the mobile terminal 102 and then performs an operation for disabling the direct connection in succession. In a step S526, the mobile terminal 102 disconnects the direct connection to the image forming apparatus 101 in response to the operation in the step S525.

In a step S527, the CPU 211 detects disconnection of the direct connection and stops the direct mode using the wireless communication conforming to the second wireless communication standard high in data transfer rate. Then, in a case where the direct mode is stopped, in a step S528, the CPU 211 starts the infrastructure mode. Thus, the operation for disconnecting the direct connection is executed by the steps S525 to S528.

The infrastructure connection is the form of connection for communication with an information processing apparatus via a network of an organization, a company or the like. In the illustrated example in FIG. 1, the infrastructure connection is communicable connection between the image forming apparatus 101 and the PC 106 via the network 100. In the infrastructure mode, the wireless communication between the image forming apparatus 102 and the mobile terminal 102 is performed via the access point 105. To set up the infrastructure connection, first, the item "infrastructure connection setting" is selected on the screen 401 displayed on the display section 210, which causes the CPU 211 to display a screen 405 on the display section 210. On the screen 405 displayed on the display section 210, there are selectably displayed an item "use infrastructure connection" and an item "IP address setting in infrastructure connection". When the user selects the item "use infrastructure connection", the CPU 211 displays a screen 406 on the display section 210.

On the screen 406 displayed on the display section 210, there are displayed an item "ON" for using the infrastructure connection, an item "OFF", an item "CANCEL", and an item "OK". When the user selects the item "ON" and then the item "OK" in succession, the CPU 211 displays a screen 407 on the display section 210.

On the screen 407, a message is displayed for explaining that when the image forming apparatus 101 is in the standby mode, the wireless communication conforming to the second wireless communication standard high in data transfer rate is performed, and that when the image forming apparatus 101 is in the sleep mode, the wireless communication conforming to the first wireless communication standard low in power consumption is performed. Further, in a central portion of the screen 407, there is displayed an attention calling message that it is necessary to make available an access point supporting the wireless communication conforming to IEEE802.11ah. Thus, the message calling attention in setting up the wireless communication conforming to the first wireless communication standard is displayed on the display section 210, which improves the convenience of a user.

When the user proceeds with the setup, following the guidance on the screen 407 displayed on the display section 210, the CPU 211 displays a screen 408 on the display section 210. On the screen 408 displayed on the display section 210, "SSID for connection in sleep mode" and "SSID for connection in standby mode" are displayed, and an item "ON" and an item "OFF" are selectably displayed for the setting. When the item "ON" is selected, the CPU 211 sets the infrastructure connection to an enabled state. The selection items are sequentially displayed on the screens 406 to 408 displayed on the display section 2, and by selecting these sequentially displayed items, the infrastructure mode is set.

As described above, for example, the CPU 211 sequentially displays the selection menus on the display section 210, for configuring the settings for establishing the infrastructure connection to communicate with the other PC 106 via the network 100. Then, the user performs the setting operation according to the displayed selection menus. With this, it is possible to establish infrastructure connection using wide-area wireless communication conforming to the first wireless communication standard and infrastructure connection using small-area wireless communication conforming to the second wireless communication standard. Then, the CPU 211 displays the attention calling information (appearing in the central portion of the screen 407) when setting the infrastructure connection using the wide-area wireless communication conforming to the first wireless communication standard on the display section 210. As a result, it becomes easy to configure the settings of the infrastructure connection, and since the attention is called to the use of the wide-area wireless communication conforming to the first wireless communication standard, it is possible to realize user-friendly user interface (UI).

Figure 6:
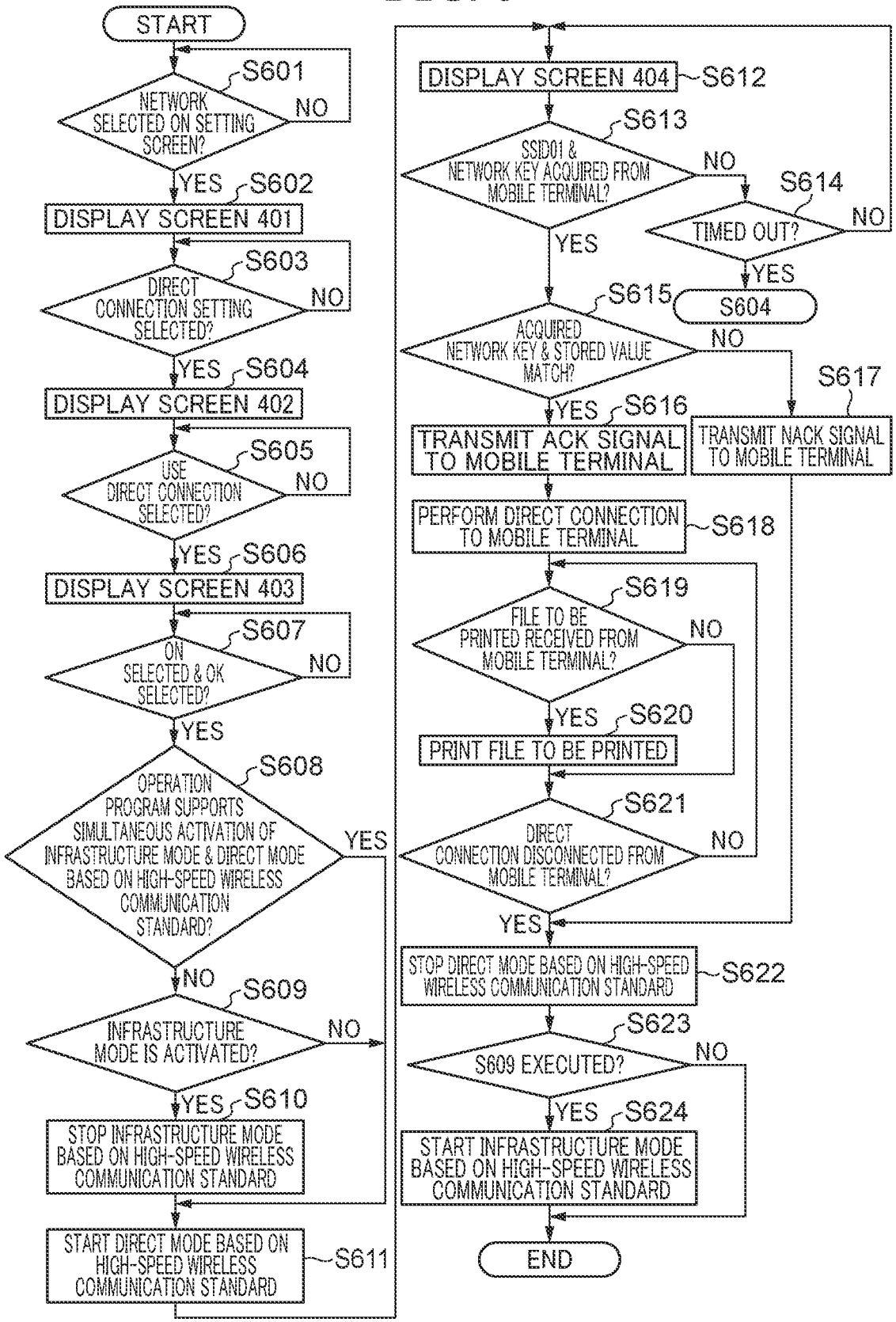
FIG. 6 is a flowchart of a direct connection process performed by the image forming apparatus according to the first embodiment.

FIG. 6 is a flowchart of a direct connection process performed by the image forming apparatus 101 according to the first embodiment. First, in a step S601, the CPU 211 determines whether or not the item "network" has been selected on the setting screen displayed on the display section 210. If it is determined in the step S601 that the item "network" has been selected (YES), the CPU 211 proceeds to a step S602. On the other hand, if it is determined in the step S601 that the item "network" has not been selected (NO), the CPU 211 returns to the step S601. In the step S602, the CPU 211 displays the screen 401 on the display section 210.

Next, in a step S603, the CPU 211 determines whether or not the item "direct connection setting" has been selected on the screen 401 displayed on the display section 210. If it is determined in the step S603 that the item "direct connection setting" has been selected (YES), in a step S604, the CPU 211 displays the screen 402 on the display section 210. On the other hand, if it is determined in the step S603 that the item "direct connection setting" has not been selected (NO), the CPU 211 returns to the step S603.

Next, in a step S605, the CPU 211 determines whether or not the item "use direct connection" has been selected on the screen 402 displayed on the display section 210. If it is determined in the step S605 that the item "use direct connection" has been selected (YES), the CPU 211 proceeds to a step S606. On the other hand, if it is determined in the step S605 that the item "use direct connection" has not been selected (NO), the CPU 211 returns to the step S605. In the step S606, the CPU 211 displays the screen 403 on the display section 210.

Next, in a step S607, the CPU 211 determines whether or not the item "ON" has been selected and then the item "OK" has been selected in succession on the screen 403 displayed on the display section 210. If it is determined in the step S607 that the item "ON" has been selected and then the item "OK" has been selected in succession (YES), the CPU 211 proceeds to a step S608. On the other hand, if it is determined in the step S607 that the item "ON" and the item "OK" have not been selected in succession (NO), the CPU 211 returns to the step S607.

Next, in the step S608, the CPU 211 determines whether or not the operation program supports simultaneous activation of the infrastructure mode and the direct mode each using the wireless communication conforming to the second wireless communication standard high in data transfer rate. If it is determined in the step S608 that the operation program does not support simultaneous activation of the two modes each using the wireless communication conforming to the second wireless communication standard (NO), the CPU 211 proceeds to a step S609. On the other hand, if it is determined in the step S608 that the operation program supports simultaneous activation of the two modes (YES), the CPU 211 proceeds to a step S611.

Next, in the step S609, the CPU 211 determines whether or not the infrastructure mode is in the activated state. If it is determined in the step S609 that the infrastructure mode is in the activated state (YES), the CPU 211 proceeds to a step S610. On the other hand, if it is determined in the step S609 that the infrastructure mode is not in the activated state (NO), the CPU 211 proceeds to the step S611.

Next, in the step S610, the CPU 211 stops the wireless communication conforming to the second wireless communication standard high in data transfer rate and proceeds to the step S611. In the step S611, the CPU 211 starts the direct mode using the wireless communication conforming to the second wireless communication standard high in data transfer rate and proceeds to a step S612. In the step S612, the CPU 211 displays the screen 404 on the display section 210. On the screen 404 displayed on the display section 210, the information indicating the operation procedure of the mobile terminal 102 and the connection information of the second wireless communication standard, i.e. SSID01 and network key 01, is displayed.

Next, in a step S613, the CPU 211 determines whether or not the SSID01 and the network key for the wireless communication conforming to the second wireless communication standard high in data transfer rate have been acquired from the mobile terminal 102. If it is determined in the step S613 that the SSID01 and the network key for the wireless communication conforming to the second wireless communication standard high in data transfer rate have been acquired (YES), the CPU 211 proceeds to a step S615. On the other hand, if it is determined in the step S613 that the SSID01 and the network key for the wireless communication conforming to the second wireless communication standard high in data transfer rate have not been acquired (NO), the CPU 211 proceeds to a step S614.

Next, in the step S614, the CPU 211 determines whether or not the operation has timed out, i.e. connection waiting time elapsed is equal to or longer than a predetermined time period, and if it is determined that the connection waiting time is equal to or longer than the predetermined time period (YES), the CPU 211 returns to the step S604. On the other hand, if it is determined in the step S614 that the connection waiting time is shorter than the predetermined time period (NO), the CPU 211 returns to the step S612.

Next, in the step S615, the CPU 211 determines whether or not the acquired network key matches a network key stored in the flash memory 214. If it is determined in the step S615 that the acquired network key matches the network key stored in the flash memory 214 (YES), the CPU 211 proceeds to a step S616. On the other hand, if it is determined in the step S615 that the acquired network key and the stored network key do not match (NO), the CPU 211 proceeds to a step S617. In the step S617, the CPU 211 transmits a NACK signal to the mobile terminal 102 and proceeds to a step S622. The NACK signal is a signal indicating that the direct connection cannot be established.

In the step S616, the CPU 211 transmits the ACK signal to the mobile terminal 102 and proceeds to a step S618. In the step S618, the CPU 211 establishes the direct connection to the mobile terminal 102.

Next, in a step S619, the CPU 211 determines whether or not a file to be printed has been received from the mobile terminal 102. If it is determined in the step S619 that a file to be printed has been received from the mobile terminal 102 (YES), the CPU 211 proceeds to a step S620. On the other hand, if it is determined in the step S619 that a file to be printed has not been received from the mobile terminal 102 (NO), the CPU 211 proceeds to a step S621. In the step S620, the CPU 211 controls the printer 202 to print the file to be printed.

Next, in the step S621, the CPU 211 determines whether or not the direct connection to the mobile terminal 102 has been disconnected. If it is determined that the direct connection to the mobile terminal 102 has been disconnected (YES), the CPU 211 proceeds to the step S622. On the other hand, if it is determined in the step S621 that the direct connection to the mobile terminal 102 has not been disconnected (NO), the CPU 211 returns to the step S619.

Next, in the step S622, the CPU 211 stops the direct mode using the wireless communication conforming to the second wireless communication standard high in data transfer rate. In the following step S623, the CPU 211 determines whether or not the step S610 has already been executed. If it is determined that the step S609 has already been executed (YES), the CPU 211 proceeds to a step S624. On the other hand, if it is determined in the step S623 that the step S610 has not been executed (NO), the CPU 211 terminates the present process. In the step S624, the CPU starts the infrastructure mode using the wireless communication conforming to the second wireless communication standard high in data transfer rate, followed by terminating the present process.

As described in the process from the step S601 to the step S618 in FIG. 6 and as shown in the screens 401 to 404, the CPU 211 sequentially displays the selection menus for configuring the settings for establishing the direct connection to the mobile terminal 102 on the display section 210. The user performs the selection operations according to the selection menus sequentially displayed on the display section 210. This causes the image forming apparatus 101 to finally establish the direct connection using the small-area wireless communication conforming to the second wireless communication standard.

That is, it is possible to prevent the image forming apparatus 101 from using the wide-area wireless communication conforming to the first wireless communication standard, through operations performed by a general user for setting up the direct connection. As a result, it is possible to prevent the mobile terminal 102 existing remote from the self-apparatus (image forming apparatus 101) from performing automatic direct connection to the self-apparatus.

Further, in a case where login of an administrator having authority has been detected, the selection menus may be sequentially displayed on the display section 210 such that the direct connection between the self-apparatus and the mobile terminal 102 can be established not only by the small-area wireless communication conforming to the second wireless communication standard, but also by the wide-area wireless communication conforming to the first wireless communication standard.

Hereafter, a second embodiment of the present invention will be described. The second embodiment is characterized in that the direct connection using the wireless communication conforming to the first wireless communication standard which enables wide-area communication is inhibited in the initial state, and energy-saving direct connection which is the direct connection in an energy-saving state can be set enabled/disabled in an administrator mode. FIG. 4B is a schematic explanatory diagram showing changes of the display screen displayed on the display section 210 in the second embodiment. FIG. 7 is a diagram useful in explaining a sequence of displaying energy-saving direct connection information of the image forming apparatus 101 according to the second embodiment.

First, a sequence of setting an energy-saving direct connection mode in the administrator mode will be described. In a step S701, the administrator selects an item "administrator mode" on a home screen (not shown) displayed on the display section 210 and logs in. In a step S702, the CPU 211 displays a screen 409 on the display section 210 in response to the login in the administrator mode. On the topmost portion of the screen 409 displayed on the display section 210, a character string of "administrator mode" is displayed which indicates that an operation is being performed in the administrator mode. On the screen 409 displayed on the display section 210, an item "energy-saving direct connection display" is also displayed. As the initial state of the item "energy-saving direct connection display", "OFF" is displayed.

Next, in a step S703, the administrator selects the item "energy-saving direct connection display". In a step S704, the CPU 211 displays a screen 410 on the display section 210 in response to selection of the item "energy-saving direct connection display". The screen 410 displayed on the display section 210 is a screen for enabling the administrator to select whether to enable the energy-saving direct connection display or not, with an item "ON", an item "OFF", an item "CANCEL", and an item "OK" displayed thereon.

Next, in a step S705, the administrator selects the item "ON" and then selects the item "OK" in succession. In a step S706, the CPU 211 sets the energy-saving direct connection display of the image forming apparatus 101 to an enabled state in response to selection in the step S705. In a step S707, the CPU 211 displays a screen 411 on the display section 210. On the screen 411 displayed on the display section 210, the setting state of the energy-saving direct connection display has been changed to the enabled state (ON).

Next, a sequence of displaying the energy-saving direct connection information in a user mode will be described. In a step S711, the user selects the item "network" on the setting screen displayed on the display section 210. In a step S712, the CPU 211 displays the screen 401 appearing in FIG. 4A on the display section 210. On the screen 401 displayed on the display section 210, the item "infrastructure connection setting" and the item "direct connection setting" are displayed.

Next, in a step S713, the user selects the item "direct connection setting". In a step S714, the CPU 211 displays a screen 412 appearing in FIG. 4B on the display section 210. On the screen 412 displayed on the display section 210, an item "use high-speed direct connection", an item "use energy-saving direct connection", and an item "IP address setting for direct connection" are displayed. A high-speed direct connection mode is a mode of the direct connection using the wireless communication conforming to the second wireless communication standard which is high in data transfer rate for a small area. The energy-saving direct connection mode is a mode of the direct connection using the wireless communication conforming to the first wireless communication standard which is low in data transfer rate for a wide area and low in power consumption.

Next, in a step S715, the user selects the item "use energy-saving direct connection". In a step S716, the CPU 211 displays a screen 413 on the display section 210 in response to selection of the item "use energy-saving direct connection". The screen 413 displayed on the display section 210 is a setting screen for using the energy-saving direct connection, with an item "ON" an item "OFF", an item "CANCEL", and an item "OK" displayed thereon.

Next, in a step S717, the user selects the item "ON" and then selects the item "OK" in succession. In a step S718, if the infrastructure mode of the image forming apparatus 101 is in the activated state, the CPU 211 stops the infrastructure mode. However, the step S718 is executed only in a case where the operation program of the image forming apparatus 101 does not support simultaneous activation of the infrastructure mode and the direct mode using the wireless communication conforming to the second wireless communication standard high in data transfer rate.

Next, in a step S719, the CPU 211 starts the direct mode using the wireless communication conforming to the first wireless communication standard which is low in data transfer rate for a wide area and low in power consumption. Then, in a step S720, the CPU 211 displays a screen 414 on the display section 210. On the screen 414, there are displayed a message describing characteristics of the energy-saving direct connection and recommending high-speed direct connection (characteristics information and recommendation information). Further, the CPU 211 displays connection information (SSID01 and network key 02) for the wireless communication conforming to the first wireless communication standard which is low in data transfer rate for a wide area and low in power consumption.

Note that in a case where the connection information is fixedly set for the connection setting of the image forming apparatus 101, there is a possibility that the mobile terminal 102 which exists remote and has been connected to the image forming apparatus 101 before is automatically reconnected. Therefore, the message to the effect that energy-saving direct connection is not available is displayed. This message is for calling attention to the use of the wireless communication conforming to the first wireless communication standard.

Figure 8A:
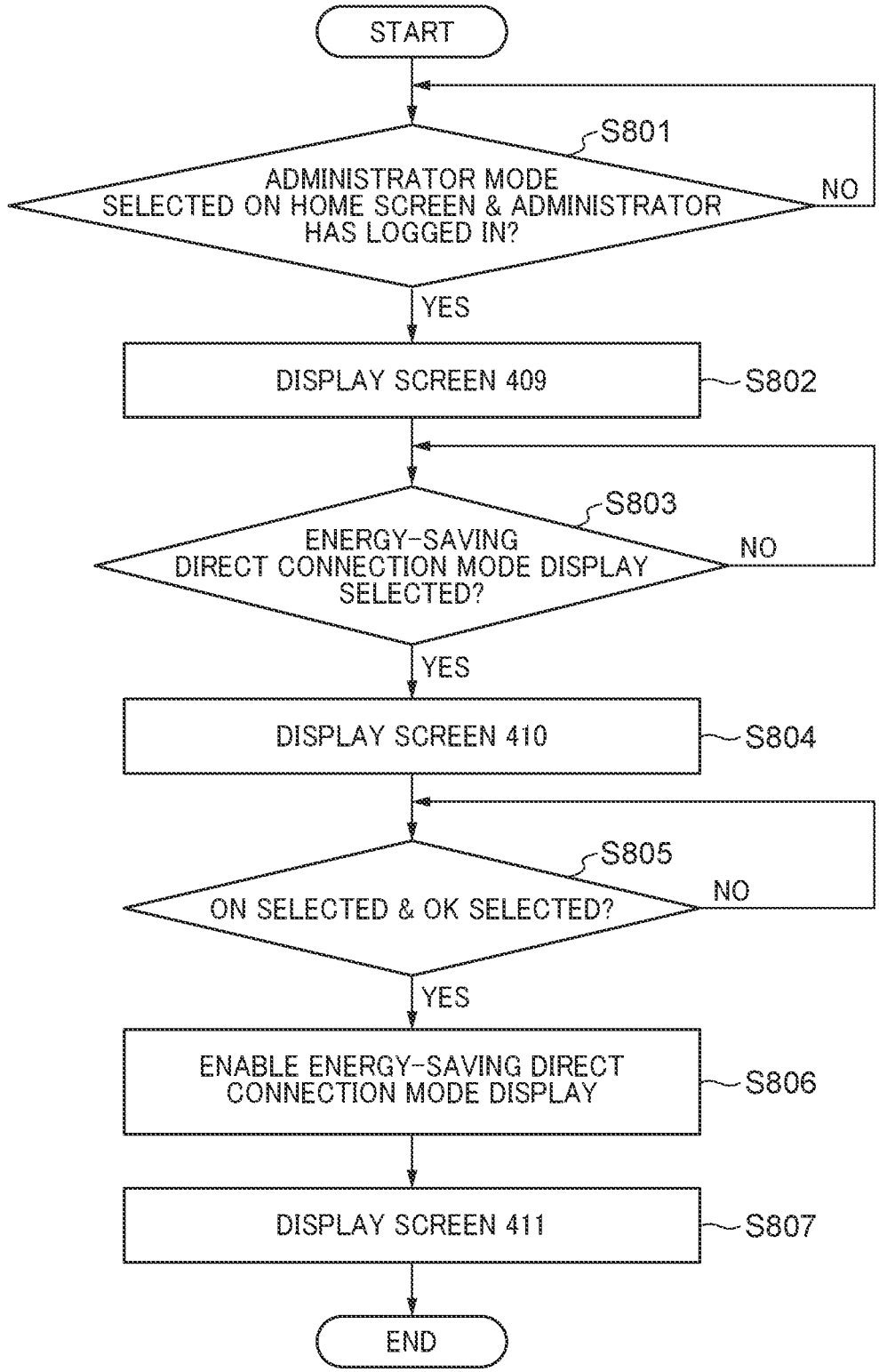
FIG. 8A is a flowchart of an energy-saving direct connection-setting process in an administrator mode in the second embodiment.
Figure 8B:
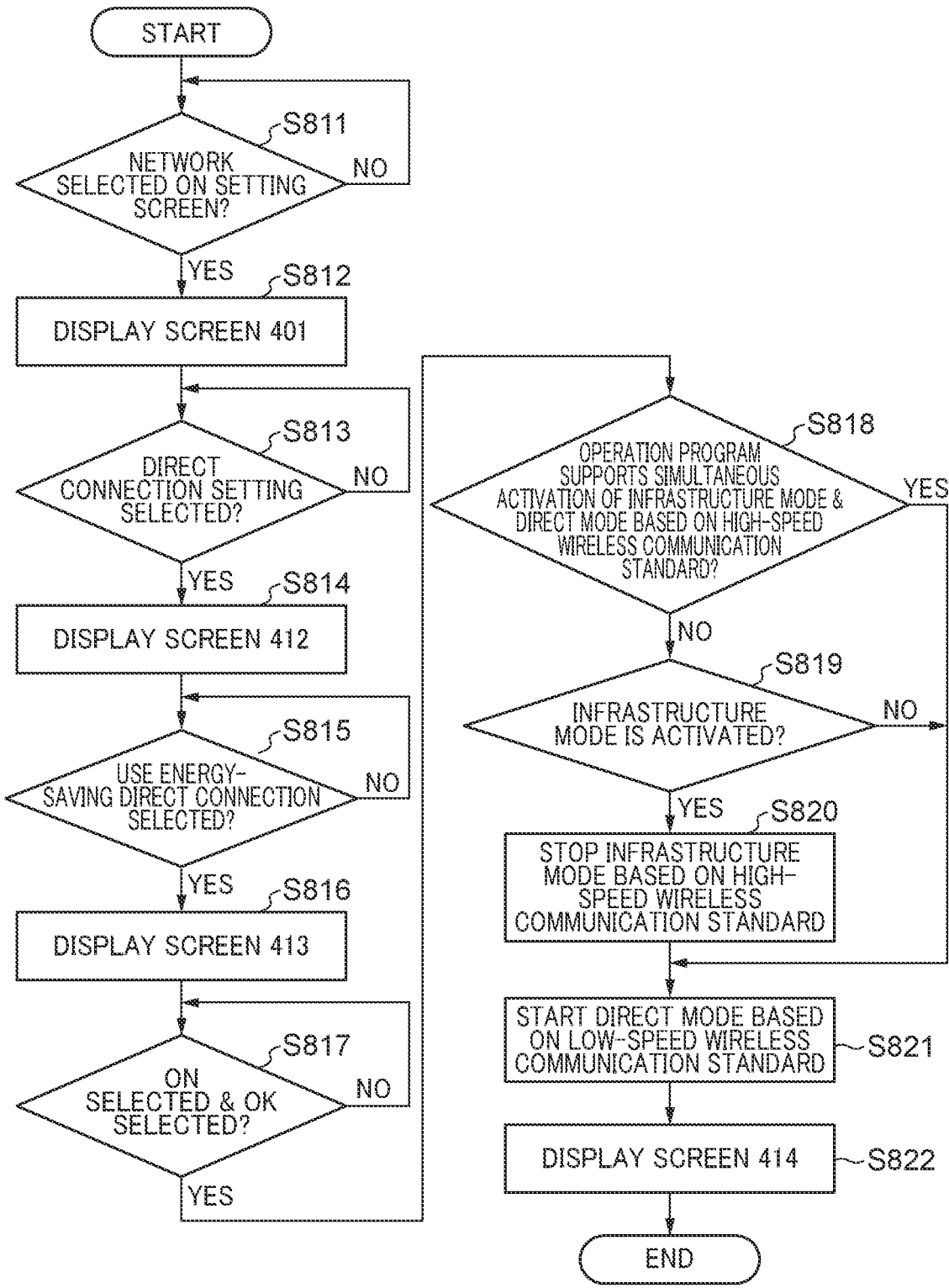
FIG. 8B is a flowchart of an energy-saving direct connection-setting process in a user mode in the second embodiment.

FIGS. 8A and 8B are flowcharts of energy-saving direct connection-setting processes in the administrator mode and the user mode, respectively, which are performed by the image forming apparatus 101 according to the second embodiment. First, an energy-saving direct connection-setting process in the administrator mode will be described with reference to FIG. 8A.

First, in a step S801, the CPU 211 determines, on the home screen (not shown) displayed on the display section 210, whether or not the administrator mode has been selected and the administrator has logged in. Next, if it is determined in the step S801 that the administrator mode has been selected and the administrator has logged in (YES), the CPU 211 proceeds to a step S802. On the other hand, if it is determined that the administrator mode has not been selected and the administrator has not logged in (NO), the CPU 211 returns to the step S801.

Next, in the step S802, the CPU 211 displays the screen 409 appearing in FIG. 4B on the display section 210. In a step S803, the CPU 211 determines whether or not the item "energy-saving direct connection display" has been selected on the screen 409 displayed on the display section 210. If it is determined in the step S803 that the item "energy-saving direct connection display" has been selected (YES), the CPU 211 proceeds to a step S804. On the other hand, if it is determined in the step S803 that the item "energy-saving direct connection display" has not been selected (NO), the CPU 211 returns to the step S803.

Next, in the step S804, the CPU 211 displays the screen 410 on the display section 210. In a step S805, the CPU 211 determines whether or not the item "ON" has been selected and then the item "OK" has been selected in succession on the screen 410 displayed on the display section 210. If it is determined in the step S805 that the item "ON" has been selected and then the item "OK" has been selected in succession (YES), the CPU 211 proceeds to a step S806. On the other hand, if it is determined in the step S805 that the item "ON" and the item "OK" have not been selected in succession on the screen 410 displayed on the display section 210 (NO), the CPU 211 returns to the step S805. In the step S806, the CPU 211 sets the energy-saving direct connection display to an enabled state (ON). In a step S807, the CPU 211 displays the screen 411 on the display section 210.

By performing the above-described process in FIG. 8A, the energy-saving direct connection in the administrator mode is set. As described in the steps S801 to S807 in FIG. 8A, in a case where the login of the administrator to the self-apparatus has been detected, the selection menus for enabling only the logged-in administrator to perform the selection operations for setting the energy-saving direct connection are sequentially displayed on the display section 210.

With this, the administrator having the authority can perform the energy-saving direct connection setting, and it is possible to inhibit a general user from performing this setting. As a result, it is possible to realize the user interface which is convenient for the system administrator.

Next, an energy-saving direct connection-setting process in the user mode will be described with reference to FIG. 8B. First, in a step S811, the CPU 211 determines whether or not the item "network" has been selected on the setting screen. If it is determined in the step S811 that the item "network" has been selected on the setting screen (YES), the CPU 211 proceeds to a step S812. On the other hand, if it is determined in the step S811 that the item "network" has not been selected on the setting screen (NO), the CPU 211 returns to the step S811.

Next, in the step S812, the CPU 211 displays the screen 401 appearing in FIG. 4A on the display section 210. In a step S813, the CPU 211 determines whether or not the item "direct connection setting" has been selected on the screen 401 displayed on the display section 210. If it is determined in the step S813 that the item "direct connection setting" has been selected on the screen 401 displayed on the display section 210 (YES), the CPU 211 proceeds to a step S814. On the other hand, if it is determined in the step S813 that the item "direct connection setting" has not been selected on the screen 401 displayed on the display section 210 (NO), the CPU 211 returns to the step S813.

Next, in the step S814, the CPU 211 displays the screen 412 on the display section 210. On the screen 412 displayed on the display section 210, the item "use high-speed direct connection", the item "use energy-saving direct connection", and the item "IP address setting for direct connection" are selectably displayed. In a step S815, the CPU 211 determines whether or not the item "use energy-saving direct connection" has been selected on the screen 412 displayed on the display section 210. If it is determined in the step S815 that the item "use energy-saving direct connection" has been selected on the screen 412 displayed on the display section 210 (YES), the CPU 211 proceeds to a step S816. On the other hand, if it is determined in the step S815 that the item "use energy-saving direct connection" has not been selected on the screen 412 displayed on the display section 210 (NO), the CPU 211 returns to the step S815.

Next, in the step S816, the CPU 211 displays the screen 413 on the display section 210. On the screen 413 displayed on the display section 210, the item "ON", the item "OFF", the item "CANCEL", and the item "OK" are selectably displayed. In a step S817, the CPU 211 determines whether or not the item "ON" has been selected and then the item "OK" has been selected in succession on the screen 413 displayed on the display section 210. If it is determined in the step S817 that the item "ON" has been selected and then the item "OK" has been selected in succession on the screen 413 displayed on the display section 210 (YES), the CPU 211 proceeds to a step S818. On the other hand, if it is determined in the step S817 that the item "ON" and the item "OK" have not been selected in succession on the screen 413 displayed on the display section 210 (NO), the CPU 211 returns to the step S817.

Next, in the step S818, the CPU 211 determines whether or not the operation program supports simultaneous activation of the infrastructure mode and the direct mode using the wireless communication conforming to the second wireless communication standard high in data transfer rate. If it is determined in the step S818 that the operation program does not support simultaneous activation of the infrastructure mode and the direct mode using the wireless communication conforming to the second wireless communication standard high in data transfer rate (NO), the CPU 211 proceeds to a step S819. On the other hand, if it is determined in the step S818 that the operation program supports simultaneous activation of the infrastructure mode and the direct mode using the wireless communication conforming to the second wireless communication standard high in data transfer rate (YES), the CPU 211 skips to a step S821.

Next, in the step S819, the CPU 211 determines whether or not the infrastructure mode is in the activated state. If it is determined in the step S819 that the infrastructure mode is in the activated state (YES), the CPU 211 proceeds to a step S820. On the other hand, if it is determined in the step S819 that the infrastructure mode is not in the activated state (NO), the CPU 211 skips to the step S821.

Next, in the step S820, the CPU 211 stops the infrastructure mode using the wireless communication conforming to the second wireless communication standard which is high in data transfer rate. In the step S821, the CPU 211 starts the direct mode using the wireless communication conforming to the first wireless communication standard which is low in data transfer rate for a wide area and low in power consumption. Then, in a step S822, the CPU 211 displays the screen 414 on the display section 210. On the screen 414 displayed on the display section 210, the CPU 211 displays the message describing characteristics of energy-saving direct connection and recommending high-speed direct connection. Further, the CPU 211 displays connection information (SSID02 and network key 02) for the wireless communication conforming to the first wireless communication standard which is low in data transfer rate for a wide area and low in power consumption.

By executing the above-described steps in FIG. 8, the energy-saving direct connection-setting process in the user mode is performed. The CPU 211 sequentially displays the selection menus for configuring the settings for establishing the energy-saving direct connection on the display section 210. Then, the user performs the selection operations according to the selection menus sequentially displayed on the display section 210. This makes it possible to cause the image forming apparatus 101 to finally establish the energy-saving direct connection, by using one of the wireless communication conforming to the first wireless communication standard which is low in data transfer rate for a wide area and low in power consumption and the wireless communication conforming to the second wireless communication standard which is high in data transfer rate for a small area and high in power consumption.

Then, as shown in the screen 414, the information on the respective characteristics of the wireless communication conforming to the first wireless communication standard and the wireless communication conforming to the second wireless communication standard and the information on which of the wireless communication standards is recommended are displayed on the display section 210. This enables the user to easily determine which of the wireless communication standards is to be used, and it is possible to provide the user-friendly user interface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198637 filed Dec. 7, 2021, which is hereby incorporated by reference herein in its entirety.

What is claimed is:

1. An information processing apparatus that is capable of using wireless infrastructure connection or wireless direct connection for communication with a mobile terminal, comprising:
   a first communication section configured to perform wireless communication conforming to a first wireless communication standard;
   a second communication section configured to perform wireless communication conforming to a second wireless communication standard which is lower in data transfer rate for a larger area than the first wireless communication standard,
   wherein the second communication section is able to perform the second wireless communication for the wireless direct connection;
   at least one processor; and
   a memory coupled to the at least one processor, the memory having instructions that, when executed by the processor, perform the operations as:
   a display controller configured to display, based on receiving a setting for causing the second communication section to perform the second wireless communication for the wireless direct connection, a message prompting use of not the second wireless communication standard but the first wireless communication standard for the wireless direct connection, on the display section.

2. The information processing apparatus according to claim 1, wherein the memory having instructions that, when executed by the processor, perform the operations further as:
   a communication controller configured to control communication with the mobile terminal, and
   wherein the display controller further sequentially displays selection menus for configuring settings for establishing the wireless direct connection via the second communication section, on the display section, and displays characteristic information indicative of respective characteristics of the wireless communication via the first communication section and the wireless communication via the second communication section, and recommendation information indicative of which of the wireless communications is recommended, on the display section, and
   wherein the communication controller controls the communication with the mobile terminal such that the wireless direct connection via the second communication section is established, by causing a user to perform selection operations according to the selection menus.

3. The information processing apparatus according to claim 1, wherein the memory having instructions that, when executed by the processor, perform the operations further as:
   a communication controller configured to control communication with the mobile terminal, and
   wherein in a case where login of an administrator to the self-apparatus is detected, the communication controller controls the communication with the mobile terminal such that the administrator can cause the wireless direct connection via the second communication section to be established.

4. The information processing apparatus according to claim 3, wherein in a case where the login of the administrator to the self-apparatus is detected, the display controller sequentially displays other selection menus on the display section, for enabling only the administrator having logged in to perform an operation for selecting whether to enable or disable the wireless direct connection via the second communication section.

5. The information processing apparatus according to claim 1, wherein the second wireless communication standard is "IEEE802.11ah".

* * * * *